United States Patent Office 3,538,188
Patented Nov. 3, 1970

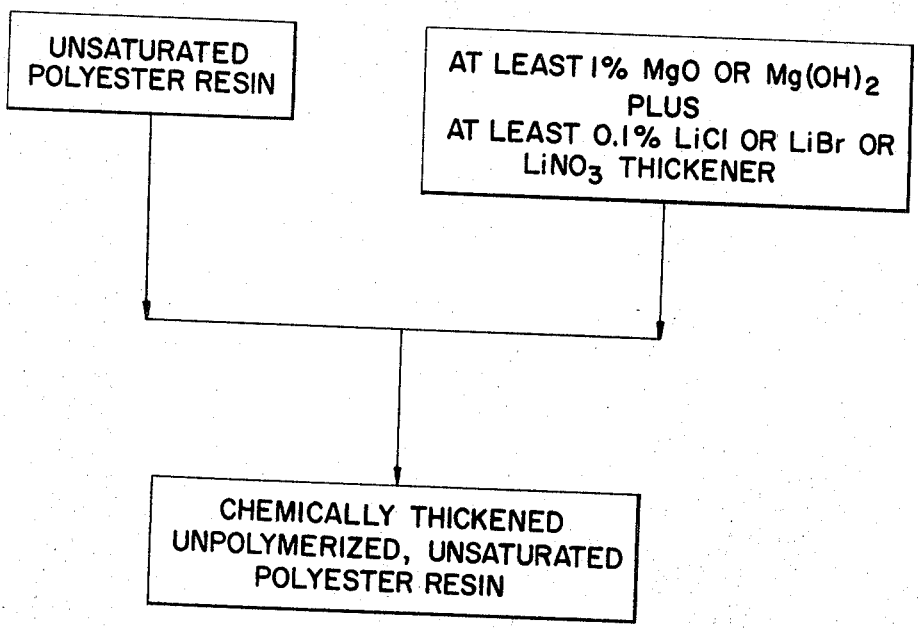

3,538,188
POLYESTER RESIN COMPOSITION HAVING A THICKENING AGENT THEREIN
Frank Fekete and Melvin E. Baum, Monroeville, Pa., assignors to Koppers Company, Inc., a corporation of Delaware
Filed Aug. 7, 1967, Ser. No. 658,826
Int. Cl. C08f 21/02
U.S. Cl. 260—865         8 Claims

ABSTRACT OF THE DISCLOSURE

The viscosity of unsaturated polyester resins formed by dissolving the condensation polymers of unsaturated dicarboxylic acids and dihydric alcohols in ethylenically unsaturated copolymerizable monomers may be increased by adding a mixture of inorganic lithium and magnesium salts to the unsaturated polyester resin. A mixture of magnesium oxide and lithium chloride, yields particularly outstanding results. These salts initially inhibit the viscosity build-up during the first 24 hours which lengthens the pot-life. Unsaturated polyester resins having thickening agents therein are useful in precoating of glass fiber mats.

BACKGROUND OF THE INVENTION

Cured unsaturated polyester resins which have been reinforced by fibrous materials such as glass fiber mats or the like have excellent physical strength characteristics. However, the formation of shaped objects with such materials has presented problems because the fibers initially immersed within the uncured liquid resin tend to rise to the surface causing the object, after curing of the resin, to have irregularities in the surface.

To avoid this problem, preforms have been made by spraying glass fibers onto screens similar in shape to the final desired product. Air is sucked through the screen to hold the fibers in place. A binder is then sprayed over the fibers and cured to hold the fibers together in the desired form. The form is then placed into a mold and the unsaturated polyester resin is poured into the mold and cured therein. The resin must be viscous enough to adhere to the form, yet not so viscous as to prevent proper wetting of the fibers.

To overcome the foregoing cumbersome and critical process, it has been proposed to coat the glass fibers with the uncured unsaturated polyester resin liquid to thoroughly wet the fiber. The liquid resin is then thickened without actually curing the resin by chemical or physical means. The physical means include: (1) driving off a volatile solvent in which a viscous polyester resin has been dissolved, or (2) using a heated viscous polyester resin and then cooling the coated fibers after application. The chemical means include: (1) the addition of a thickening agent such as MgO to the polyester resin, or (2) the partial copolymerization or curing of the resin to a gelled or B-stage.

However, such systems each have certain economic drawbacks. The solvent system, of course, results in loss of the solvent plus disposal of the fumes. Heating viscous polyesters to reduce their viscosity is costly and cumbersome. Chemically thickening the polyester resin such as by the addition of MgO or $Mg(OH)_2$ as shown in U.S. Pat. 2,568,331, issued to Vincent Frilette results in an eventual viscosity build-up; however, one of its drawbacks is that the initial thickening rapidly builds up the viscosity which reduces the pot-life of the resin. Another difficulty encountered is the slow overall build-up of the viscosity of the resin. Resins modified to rapidly cure to a B-stage have a tendency to continue to cure or harden beyond the B-stage within a short period of time.

SUMMARY OF THE INVENTION

Quite surprisingly, we have discovered a system for chemically thickening polyester resins which comprise the addition of a mixture of inorganic salts which inhibits viscosty build-up for about 24–48 hours and thereafter causes a rapid high viscosity build-up. The invention thus allows the pot-life of the resin to be extended yet provides a rapid high viscosity build-up after the initial inhibition of viscosity increase. After eight days, the viscosity of the polyester resins thickened in accordance with the invention increases over 200 times the viscosity attained in the initial 24 hours.

In accordance with the invention, an unsaturated polyester resin composition which increases in viscosity after formation of the composition comprises: (a) an unsaturated polyester formed by condensing at least one dicarboxylic acid containing $\alpha,\beta$-ethylenic unsaturation, and a dihydric alcohol; (b) an $\alpha,\beta$-ethylenically unsaturated copolymerizable monomer; and (c) a thickening agent that will increase the viscosity of the composition after a spaced period of time, the thickening agent consisting essentially of a combination of inorganic magnesium and lithium salts. The preferred inorganic magnesium salts are oxides and hydroxides of magnesium, while the preferred inorganic lithium salts are the halides and the oxides of nitrogen.

DETAILED DESCRIPTION

As previously described, in accordance with the invention, an unsaturated polyester resin may be thickened by the addition of a combination of magnesium and lithium salts which initially inhibit viscosity buildup (thus giving a longer pot life) and then rapidly increasing the viscosity of the resin.

Unsaturated polyester resins are well known in the art (see, for example, U.S. Pat. 2,255,313, issued to Carleton Ellis). The unsaturated polyester is a condensation polymer formed by polyesterifying dicarboxylic acids with dihydric alcohols. To form the polyesters approximately equal-molar proportions of the dicarboxylic acids and dihydric alcohols are used. To provide unsaturation within the polyester, at least a portion of the dicarboxylic acids contain $\alpha,\beta$-ethylenic unsaturation. Examples of such unsaturated dicarboxylic acids include maleic and fumaric acids. The remainder of the dicarboxylic acids are usually either saturated normal aliphatics such as adipic acid, succinic acid, or the like, or aromatic diacids such as phthalic acid, isophthalic acid or the like.

Illustrative of the dihydric alcohols are ethylene glycol, propylene glycol, 1,2-butanediol, 1,3-butanediol, 1.4-butandiol, diethylene glycol, polyproylene glycol, 2,2′-dimethyl-1,3-propanediol, 1,4-cyclohexane dimethanol and adducts or reaction products of alkylene oxides and 2,2′-bis(4-hydroxy phenylene)propane (Bisphenol A).

The dicarboxylic acid and dihydric alcohols are reacted together in approximately equimolar proportions to form a polyester. The average molecular weight of the polymer is most conveniently measured with respect to the acid end groups. A gram of the polyester is titrated with KOH and the number of milligrams of KOH necessary to neutralize the gram of polyester is called the acid number of the polyester. Acid numbers below 100 usually signify polyesters having sufficient molecular weight to possess good physical properties. Therefore, the unsaturated polyesters useful in the invention are those possessing a molecular weight indicated by an acid number below 100.

After formation, the unsaturated polyester is usually dissolved in an ethylenically unsaturated monomer such as styrene or vinyl toluene. The unsaturated polyester resin (polyester and monomer) is then cured by initiating a free radical polymerization between the ethylenically unsaturated monomer and the unsaturated polyester at the $\alpha,\beta$-ethylenic double bonds in the polyester. This copolymerization may be initiated by UV light or radiation, but is more commonly initiated by addition of a peroxide catalyst followed by heating. The polyester resin copolymerizes to form a cross-linked thermoset resin.

Illustrative of the copolymerizable ethylenically unsaturated monomers are styrene, $\alpha$-methylstyrene, chlorostyrene, vinyl toluene, divinyl benzene and the like.

Examples of peroxide catalysts commonly used to initiate the copolymerization include benzoyl peroxide, methylethyl ketone peroxide, cumene hydroperoxide, and the like.

Other free radical generating catalysts may also be used as, for example: 2,2'-azobisisobutyronitrile.

In accordance with the invention, the viscosity of the polyester resin is increased before the final curing of the resin by the addition of novel chemical thickeners which retard rapid viscosity build-up for about 24–48 hours and thereafter rapidly raise the viscosity of the resin. This enables workmen in the field to coat, for example, glass fiber mats with the polyester resin compositions of the invention over an extended period of time without fear of premature thickening of the composition within the resin pot which might otherwise necessitate discarding resin too thick to efficiently remove from the pot or, at best, might result in improper wetting of the glass fibers. The composition of the invention not only provides a slower initial viscosity build-up, but provides a rapid and high build-up after a period of about 24–48 hours. This allows workmen, for example, to stack previously coated glass fiber mats after several days in contrast to prior art chemically thickened compositions which may remain "sticky" for several days to a week.

As will be demonstrated hereafter in the examples, polyester resins thickened in accordance with the invention exhibit such a high overall viscosity increase that after 8 days the viscosity is over 200 times the viscosity attained during the initial 24 hours. In fact, some of the increases are actually 800–1000 times. This is in marked contrast to the prior art systems thickened with only MgO in similar proportions. Such systems do not exhibit the high ratio of viscosity increases. This characteristic is very important bearing in mind that the object of any viscosity thickening system is to provide a resin of initial low viscosity which will attain high viscosity. To attempt to achieve the high viscosity results of the system of this invention by the use of MgO alone would result in a system having too high an initial viscosity for practical use.

In accordance with the invention, a mixture of magnesium and lithium inorganic salts are added to the unsaturated polyester resin before application of the resin to a substrate or fiber mat or the like. The salts may be added before, during or after the addition of the peroxide catalysts commonly used in such systems.

The amount of the inorganic salts and the ratios therebetween may vary somewhat depending upon the amount of viscosity build-up desired. It has been found, however, that the magnesium salt must be used in a minimum amount of 1.0% by weight of the polyester resin and the lithium salt must be used in a minimum amount of at least 0.1% by weight of the polyester resin. While larger amounts of either salt may be used, it has been found that amounts in excess of 2.0% magnesium salts or 1.0% lithium salts are unnecessary to achieve the rapid and high viscosity chemical thickening of the invention.

The preferred magnesium salts are magnesium oxide and magnesium hydroxide, while the preferred lithium salts are the halides and the oxides of nitrogen, (i.e., lithium fluoride, lithium chloride, lithium bromide, lithium iodide, lithium nitrate, and lithium nitrite). Especially preferred salts are magnesium oxide and lithium chloride. Other inorganic salts of these metals also be used such as lithium sulfate, lithium hydroxide, lithium acetate, lithium nitrate and lithium phosphate. However, the results obtained with these salts are not as outstanding as the results obtained using the preferred salts.

It should be noted that the chemical thickening which occurs in the invention is not a gelation or B-stage of the resin. Such gelation or B-stage is indicative that the vinyl copolymerization between the unsaturated portion of the condensation polymer and the ethylenically unsaturated monomer. The chemically thickened resin system of the invention remains, for example, completely soluoble in acetone until the subsequent high temperature cure. Gelled or B-staged polyester resins are not entirely soluble in acetone which is indicative of the presence of vinyl copolymerization.

The invention will be further understood by referring to the attached flow sheet and the following examples.

EXAMPLE I

To 100 parts by weight of KOPLAC 2000 polyester resin was added 1.5 parts by weight MgO and .7 part by weight LiCl. KOPLAC 2000 is a commercially available general purpose unsaturated polyester containing phthalic-maleic and propyleneglycol in mole ratios of 1:1:2. The polyester is dissolved in styrene, to a 64 part polyester-36 part styrene resin. The polyester resin has an acid number of about 30 and an initial viscosity of about 3400 cps. The viscosity was periodically measured with a Brookfield Syncro-lectric Viscometer (Model LVT up to 2 million centipoises and Model HBT up to 64 million centipoises) at 24° C. to record the changes.

The same viscosity measurements were made on a control polester resin made by mixing 100 part KOPLAC 2000-34 with 1.5 parts MgO (i.e., omitting the LiCl). The results are tabulated below:

|  | Viscosity in cps.×10⁻³ | | | | | | | |
|---|---|---|---|---|---|---|---|---|
|  | Initial | 4 hrs. | 24 hrs. | 30 hrs. | 48 hrs. | 72 hrs. | 96 hrs. | 192 hrs. |
| (1) Polyester resin, 1.5 parts MgO, 0.7 part LiCl | 3.4 | 5.8 | 40 | 80.5 | 810 | 4,160 | 13,760 | 46,000 |
| (2) Polyester resin, 1.5 parts MgO | 3.4 | 6.2 | 67 | 120 | 380 | 928 | 1,840 | 6,528 |

The results indicate the initial inhibting effect upon the viscosity build-up of the polyester containing the novel MgO-LiCl salt mixture of the invention compared to the polyester containing only MgO. However, already at 48 hours, the marked increased of viscosity can already be noted and the differences in viscosity after this time indicate the vast distinctions between the thickening systems.

EXAMPLE II

A number of samples were prepared using varying amounts of MgO and LiCl in KOPLAC 2000 polyester resin to determine the viscosity build-up of varying amounts of the combined salts in comparison to MgO alone. In each of the polyester resins, the indicated amounts of MgO and LiCl are in parts by weight per 100 parts of KOPLAC 2000 polyester resin. The viscosity measurements were made using the viscometers described in Example I. The recorded changes in viscosity with time for the various systems is tabulated below:

TABLE II

[Affect of amounts of MgO and LiCl on viscosity build-up with time. Initial viscosity 3,400 cps.]

| MgO, parts | LiCl, parts | Viscosity in cps. $\times 10^{-3}$ | | | | | | | |
|---|---|---|---|---|---|---|---|---|---|
| | | 4 hrs. | 7 hrs. | 1 day | 30 hrs. | 2 days | 3 days | 4 days | 8 days |
| 1.0 | 0 | 5.0 | 6.1 | 22.5 | 30.5 | 70.0 | 146 | 272 | 832 |
| 1.0 | 0.1 | 5.0 | 5.6 | 18.0 | 25.0 | 79.0 | 240 | 288 | 4,500 |
| 1.0 | 0.4 | 5.0 | 5.5 | 21.5 | 34.0 | 204 | 320 | 2,720 | 16,250 |
| 1.0 | 0.7 | 5.0 | 5.5 | 23.0 | 44.0 | 316 | 1,440 | 5,120 | 22,500 |
| 1.0 | 1.0 | 4.9 | 5.3 | 25.0 | 48.0 | 268 | 1,296 | 5,312 | 19,200 |
| 1.5 | 0 | 6.2 | 9.0 | 67.0 | 120 | 380 | 928 | 1,840 | 6,528 |
| 1.5 | 0.1 | 6.1 | 7.8 | 45.7 | 81.0 | 256 | 896 | 3,163 | 13,800 |
| 1.5 | 0.4 | 5.9 | 7.0 | 37.0 | 74.0 | 570 | 2,720 | 8,832 | 22,500 |
| 1.5 | 0.7 | 5.8 | 7.0 | 40.0 | 80.5 | 810 | 4,160 | 13,760 | 46,000 |
| 1.5 | 1.0 | 5.8 | 6.6 | 49.5 | 124 | 1,220 | 8,832 | 19,200 | 58,000 |
| 2.0 | 0 | 5.5 | 7.4 | 68.0 | 130 | 480 | 1,184 | 2,368 | 9,600 |
| 2.0 | 0.1 | 5.5 | 7.0 | 39.5 | 66.5 | 280 | 1,984 | 6,272 | 23,600 |
| 2.0 | 0.4 | 5.4 | 6.6 | 40.5 | 76.0 | 396 | 2,368 | 6,272 | 30,800 |
| 2.0 | 0.7 | 5.4 | 6.5 | 51.0 | 112 | 1,540 | 10,240 | 26,880 | 64,000+ |
| 2.0 | 1.0 | 5.0 | 6.5 | 70.0 | 292 | 3,390 | 16,640 | 31,360 | 64,000+ |

The results show that in every instance the viscosity of the polytster resins at any given MgO concentration was lower after 7 hours in the resins containing LiCl than the resins in which no LiCl was present. The results also indicate a much lower overall viscosity build-up in the the first 1–2 days of comparable systems (MgO and MgO-LiCl systems achieving comparable viscosities after about 3 days). For example, to achieve a viscosity build-up of 1,200,000 cps. in 3 days using only MgO, 2 parts per 100 parts resin must be used which results in a viscosity build-up of 68,000 cps. in 24 hours. However, using the combination of salts of the invention the same viscosity (1,000,000 cps.) can be reached in the same period of time (3 days) using 1 part MgO and 1 part LiCl per 100 parts polyester resin resulting in an initial build-up of viscosity during the first 24 hours of only 25,000 cps. On the other hand, the eventual viscosity build-up of the same MgO system discussed above only reaches $9,600 \times 10^{-3}$ cps. after 8 days while the MgO-LiCl system referred to reaches $19,200 \times 10^{-3}$ cps. in the same period of time.

The particular prior art MgO system (2 parts MgO per 100 parts polyester) was singled out for discussion because this amount of MgO is considered by those skilled in the art to be the minimum amount needed to achieve a high enough build-up of any value at all. In actual practice, it has been common to use even higher amounts of MgO to achieve higher eventual viscosities at the expense of rapid initial build-up and shortened pot-life. Table II readily indicates that when LiCl is used with MgO in accordance with the invention, amounts of MgO above 2 parts per 100 parts resin are not necessary to achieve very high eventual viscosities without shortening the pot-life of the resin. Thus, the importance of the relationship between initial low viscosity and eventual high viscosity build-up must again be emphasized. In Table II, all of the MgO-LiCl systems increased their viscosity after 8 days at least 200 times (and in some cases many times more) the viscosity attained during the initial 24 hours while none of the systems using only MgO achieved this relationship.

EXAMPLE III

A number of lithium salts were combined with both MgO and $Mg(OH)_2$ salts and mixed with KOPLAC 2000 polyester resin in the amounts indicated which are parts by weight per 100 parts by weight of the polyester resin. The viscosity measurement was made after 7 days with the visometer described in Example I. The results are tabulated below in centipoises $\times 10^{-3}$.

| Lithium salt (1 part) | MgO (2 parts) | $Mg(OH)_2$ (2.9 parts) |
|---|---|---|
| LiBr | 23,000 | 624 |
| $Li_2SO_4$ | 11,600 | 22 |
| LiOH | 5,100 | 33 |
| LiOAc | 14,400 | 32 |
| $LiNO_3$ | 24,000 | 24 |
| $Li_3PO_4$ | 11,500 | 19 |
| LiCl | 64,000 | 2,100 |
| None | 12,000 | 21 |

These results indicate that only LiCl, LiBr and $LiNO_3$ significantly affect the viscosity changes when MgO is used and that only LiCl and LiBr affect the viscosity changes in a $Mg(OH)_2$ system.

The invention disclosed herein thus enables one to chemically thicken a polyester resin to rapidly build-up the viscosity in several days without significantly increasing the initial viscosity or shortening the pot-life of the polyester resin as has been the case with the chemical thickeners used heretofore. Fibrous reinforcements can thus be pre-coated with a low viscosity polyester resin which will therefore properly wet the fibers, yet the polyester resin coatings will rapidly lose its tacky state by the increase in viscosity enhancing the storability of the pre-coated fibers.

Thus, the use of preforms is eliminated as well as the attendant mess of coating the irregular-shaped preform with a liquid resin. Glass fiber mats coated with the resin of the invention may be easily handled and charged to molding machines. More positive control of the amount of charge as well as the shape of the charge can thus be maintained resulting in higher quality molded products.

We claim:
1. An unsaturated polyester resin composition which greatly increases in viscosity after a period of 24–48 hours which consists essentially of:
   (a) an unsaturated polyester formed by condensing at least one dicarboxylic acid containing $\alpha,\beta$-ethylenic unsaturation with a dihydric alcohol;
   (b) an $\alpha,\beta$-ethylenically unsaturated copolymerizable monomer; and
   (c) a thickening agent in an amount sufficient to increase the viscosity of the composition, such that after eight days the viscosity is over two hundred times the viscosity attained during the initial twenty-four hours, consisting essentially of:
      (i) a mixture of magnesium oxide and a second component selected from lithium bromide, lithium chloride and lithium nitrate, or

(ii) a mixture of magnesium hydroxide and lithium chloride.

2. The composition of claim 1 wherein said thickening agent consists essentially of a mixture of magnesium oxide and lithium chloride.

3. The composition of claim 1 wherein said thickening agent consists essentially of a mixture of magnesium oxide and lithium bromide.

4. The composition of claim 1 wherein said thickening agent consists essentially of a mixture of magnesium hydroxide and lithium chloride.

5. The composition of claim 1 wherein said thickening agent consists essentially of at least 1% by weight of the polyester resin composition of said inorganic magnesium salt and at least 0.1% by weight of the polyester resin composition of said inorganic lithium salt.

6. An unsaturated polyester resin composition capable of a large increase in viscosity after a period of 24–48 hours after formation of the composition which consists essentially of:
(a) an unsaturated polyester formed by condensing at least one dicarboxylic acid containing $\alpha,\beta$-ethylenic unsaturation with a dihydric alcohol;
(b) an $\alpha,\beta$-ethylenically unsaturated copolymerizable monomer; and
(c) a thickening agent capable of increasing the viscosity of the composition to a viscosity which eight days after formation of the composition is over 200 times the viscosity of the composition measured during the initial 24 hours after formation of the composition, said thickening agent consisting essentially of a mixture of:
(i) at least 1% by weight of the polyester resin composition of magnesium oxide, and at least 0.1% by weight of the polyester resin composition of an inorganic lithium salt selected from the class consisting of lithium bromide, lithium chloride and lithium nitrate, or a mixture of:
(ii) at least 1% by weight of the polyester resin composition of magnesium hydroxide; and at least 0.1% by weight of the polyester resin composition of lithium chloride.

7. The composition of claim 5 wherein said magnesium salt is magnesium oxide and said lithium salt is lithium chloride.

8. The composition of claim 5 wherein said magnesium salt is magnesium hydroxide and said lithium salt is lithium chloride.

References Cited

UNITED STATES PATENTS 3,431,320   3/1969   Baum et al. _____ 260—865

FOREIGN PATENTS 1,017,050   1/1966   Great Britain.

WILLIAM H. SHORT, Primary Examiner

R. J. KOCH, Assistant Examiner

U.S. Cl. X.R.

260—75, 861